Aug. 13, 1929.   W. C. THORNTON ET AL   1,724,235
MECHANICAL STORE
Filed July 22, 1924   8 Sheets-Sheet 1

Aug. 13, 1929.  W. C. THORNTON ET AL  1,724,235
MECHANICAL STORE
Filed July 22, 1924   8 Sheets-Sheet 5

Aug. 13, 1929. W. C. THORNTON ET AL 1,724,235
MECHANICAL STORE
Filed July 22, 1924  8 Sheets-Sheet 6

Inventors
W. C. Thornton and
J. M. Cameron
John C. Tomlin
Attorney

Aug. 13, 1929.　　W. C. THORNTON ET AL　　1,724,235
MECHANICAL STOKER
Filed July 22, 1924　　8 Sheets-Sheet 7

Patented Aug. 13, 1929.

1,724,235

UNITED STATES PATENT OFFICE.

WILLIAM CARTER THORNTON AND JOHN McALPINE CAMERON, OF JOHNSON CITY, TENNESSEE, ASSIGNORS OF ONE-THIRD TO H. M. SMITH.

MECHANICAL STORE.

Application filed July 22, 1924. Serial No. 727,410.

This invention relates to stores comprising power actuated instrumentalities, and has for an object the provision of means under control of an operator for automatically conveying selected articles of merchandise to a predetermined point within the store for convenient distribution by an operator or clerk.

Another object of this invention is to provide in a store a control station of restricted dimensions to which selected articles of merchandise are conveyed by gravity and power actuated mechanism to enable an operator within the station to expeditiously distribute selected articles of merchandise to the patrons or purchasers.

An additional object of this invention is to provide in a store a collecting and distributing station having a control or "stock" board located therein which operably supports suitable control members within convenient reach of an operator positioned within the station, and each control member being operably associated with means for discharging a selected article of merchandise from a merchandise container, the discharged articles being conveyed to the station.

A further object of this invention is to provide means for supporting a large number of groups or banks of merchandise compartments in compact or nested relation, and the contents of each merchandise compartment being arranged and shaped to gravitate to a gate or stop member, and each gate being operably connected to a control member positioned within a control station and disposed in convenient reach of an operator positioned in the station, thereby enabling the operator to select and release an article or the desired number of articles of merchandise, which articles are conveyed to the control station by gravity or power actuated instrumentalities.

It is generally believed that the modern store and especially the grocery store as a whole has not kept pace in its improvements with the progress of the advancing arts, therefore it is an object of this invention to provide a store of generally improved system and construction, whereby the maintenance expense is materially reduced and distribution of the merchandise greatly expedited.

With the foregoing and other objects in view which will appear as the discription proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

The invention has been illustrated in its preferred embodiments in the accompanying drawings, wherein.

Figure 1:
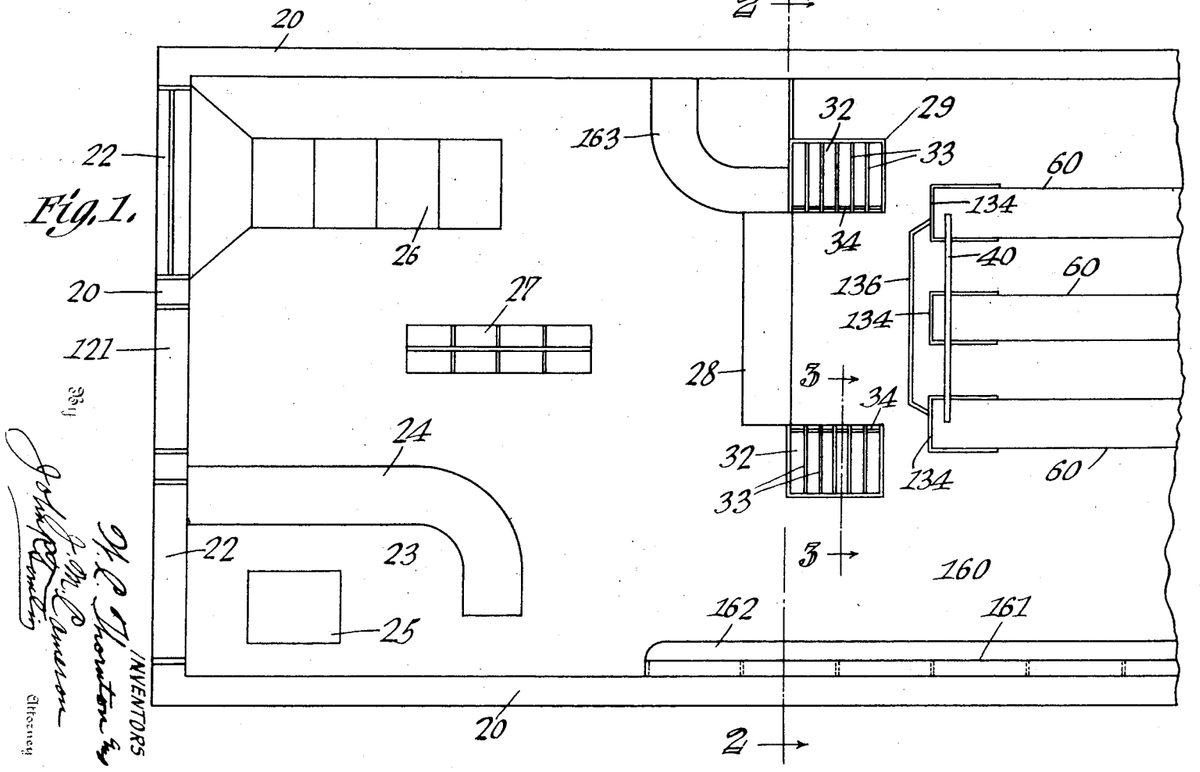
Figure 1 is a diagrammatic plan of the store embodying this invention.
Figures 2, 3, 4:
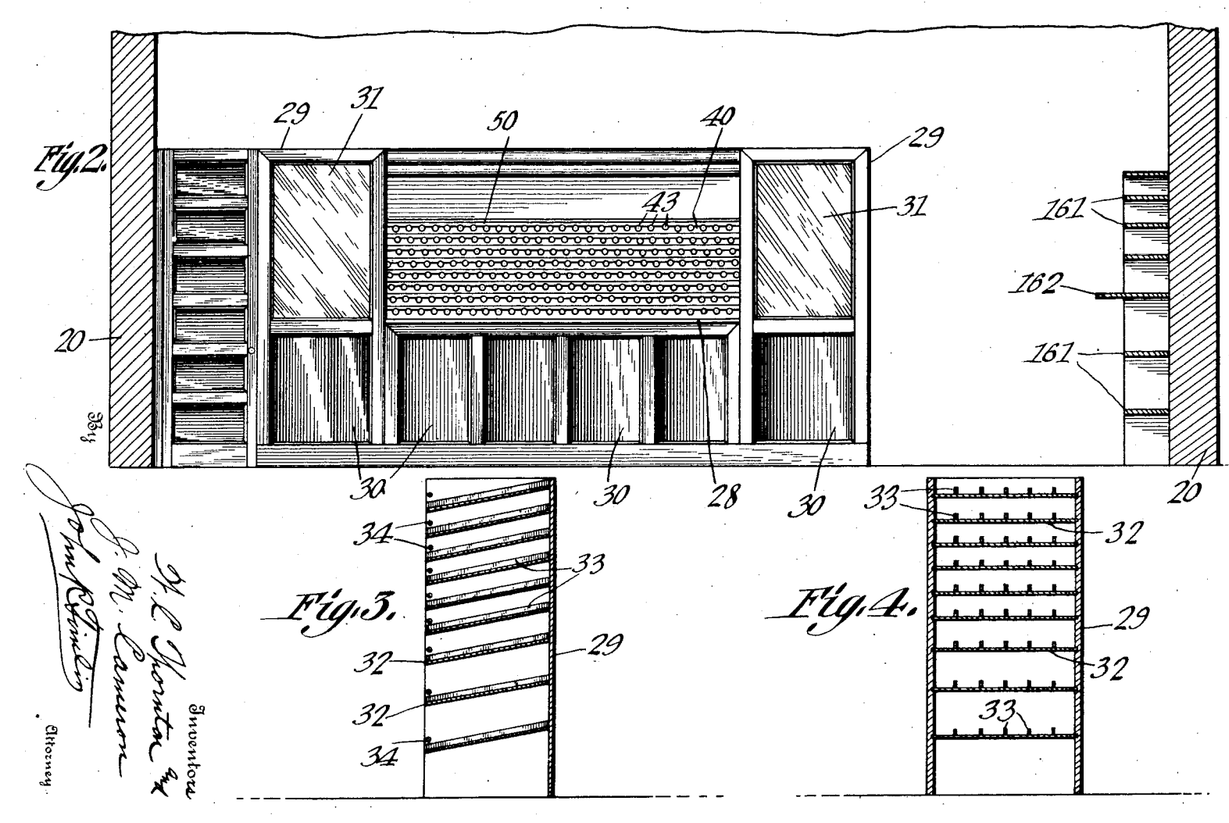
Figure 2 is a transverse sectional view taken on the line 2—2 of Figure 1.
Figure 3 is a vertical sectional view taken through one of the merchandise cabinets on the line 3—3 of Figure 1.
Figure 4 is a vertical sectional view taken through the cabinet but viewed at right angles to Figure 3.

Referring to the drawings and specifically to Figures 1 and 2, there is shown the building walls 20 of a store having a main entrance 21; display windows 22; meat department 23 preferably comprising a counter 24 and a suitable ice chest, refrigerator or other meat preserving device 25; vegetable and fruit department 26; and rest seats 27.

To the rear of the rest seats 27 there is provided a merchandise distributing counter 28, at each end and to the rear of this counter there are positioned cabinets 29 which extend above the counter to a height within convenient reach of a clerk or attendant stationed behind the counter 28. The face or front of the counter 28 and cabinets 29 may embody suitable ornamental components, such as panels 30 and mirrors 31. Each cabinet 29 is provided with a plurality of superposed shelves 32 preferably formed of plates of smooth glass or other material having a low coefficient of friction, and each shelf is inclined inwardly towards the counter. Suitable parallel partition strips 33 are secured to the upper face of each shelf, thereby dividing each shelf into a number of inclined chutes or compartments for supporting bottles, jars or other containers in separate rows. These shelves are preferably disposed at an angle of about 10 degrees from the horizontal with their lower portions disposed toward the counter. At this angle relatively tall bottles or other glass receptacles, such as usually contain jam, preserves, olives and the like, may be safely supported without danger of overturning, and each row contains a number of similar articles of merchandise. The lowermost bottles or receptacles of each row engage stop bars 34, thereby holding the rows upon the shelves. When the clerk removes the lowermost receptacle the entire row gravitates along the glass shelf until the bars are again engaged, so that whenever there are containers in the shelves they are positioned within convenient reach of the clerk.

Figures 7, 8, 9:
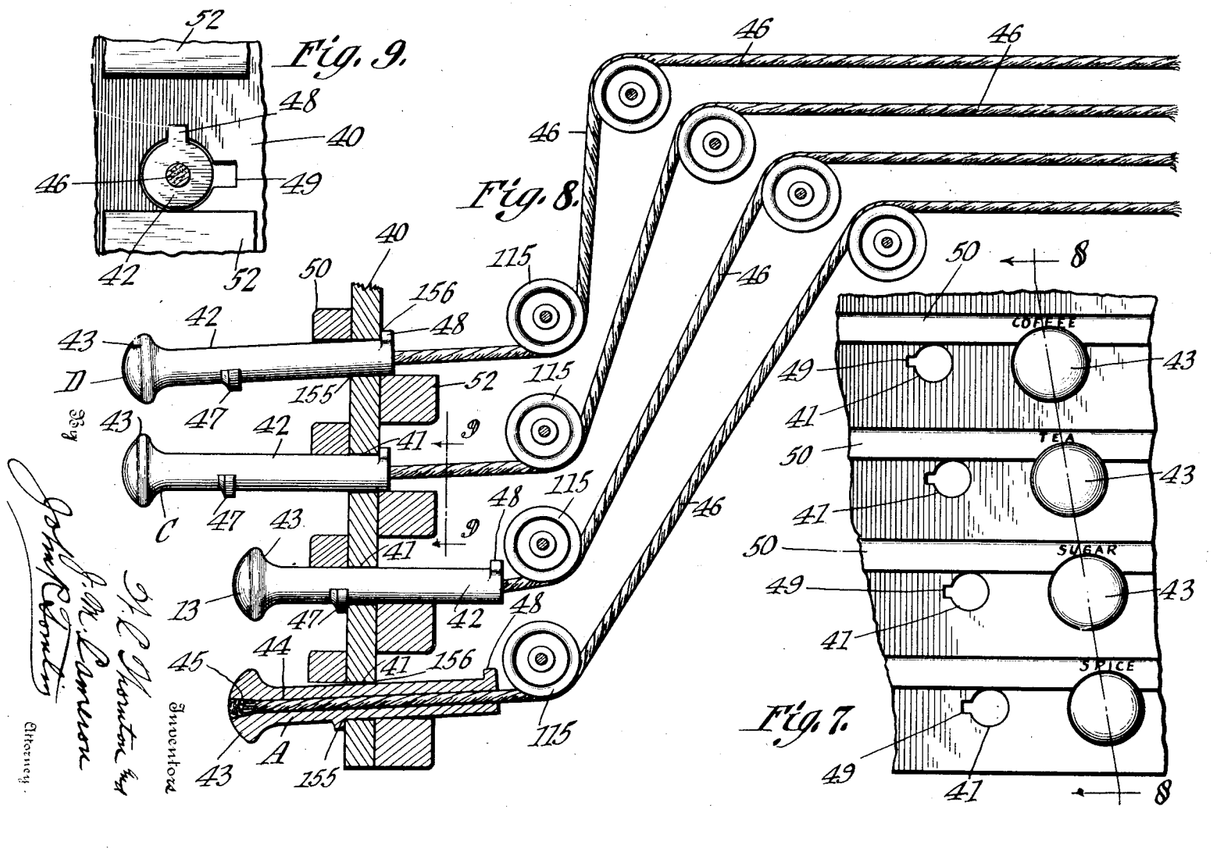
Figure 7 is a face view of a portion of the control or stock board with certain of the control knobs removed.
Figure 8 is a fragmental vertical sectional view, taken through the stock board on the line 8—8 of Figure 7, and depicting the control members or pins in their various operating positions.
Figure 9 is a fragmental vertical sectional view taken on the line 9—9 of Figure 8, showing the rear of the stock board in elevation.

Immediately behind the distributing counter 28 there is provided a stock or control board 40 of such height that any portion of the board may be readily reached by a clerk standing behind the counter 28. The board 40 is provided with a plurality of apertures 41, as shown in Figures 7, 8, and 9, for the sliding reception of the cylindrical shanks of control members or manipulating pins 42 having enlarged knobs 43 formed at one end thereof. Each manipulating member 42 has an axial aperture 44 extending therethrough which is laterally enlarged or flared at its outer or knob end, as indicated at 45. A cord, cable or other flexible member 46 extends through the aperture 44 and is secured to the manipulation pin or control member 42 in any preferred manner. In the present instance the cable 46 is untwisted at its outer end and the separate strands are knotted, thereby laterally enlarging the cable at this point so that it will securely bind within the flared aperture 45 when a rearward stress is exerted upon the cable. To further aid in securing the cable to its pin the aperture 45 is preferably filled with melted rosin or like material. The rearward movement of each pin 42 is limited by a stop flange 47 which engages the front face of the stock board 40, and the forward or outward movement of each pin 42 is limited by a stop finger 48 which engages the rear face of the board 40. A recess 49 extends laterally from each aperture 41, and in order to remove a pin 42 from the board 40 it is only necessary to turn the pin 42 until the stop finger 48 registers with the recess 49, and then the stop 48 can readily pass through this recess. The stock or control board has a plurality of ribs 50 extending across its front face from end to end and positioned so that the lower faces of the ribs coincide with the upper portions of the peripheries of the apertures 41. Ribs or strips 52 extend across the rear face of the board 40, from end to end, and are positioned so that the upper faces coincide with the lower portions of the peripheries of the apertures 41. These ribs reinforce the board 40 against breaking or warping, and also guide the pins 42, as will be hereinafter disclosed.

Figures 5, 6:
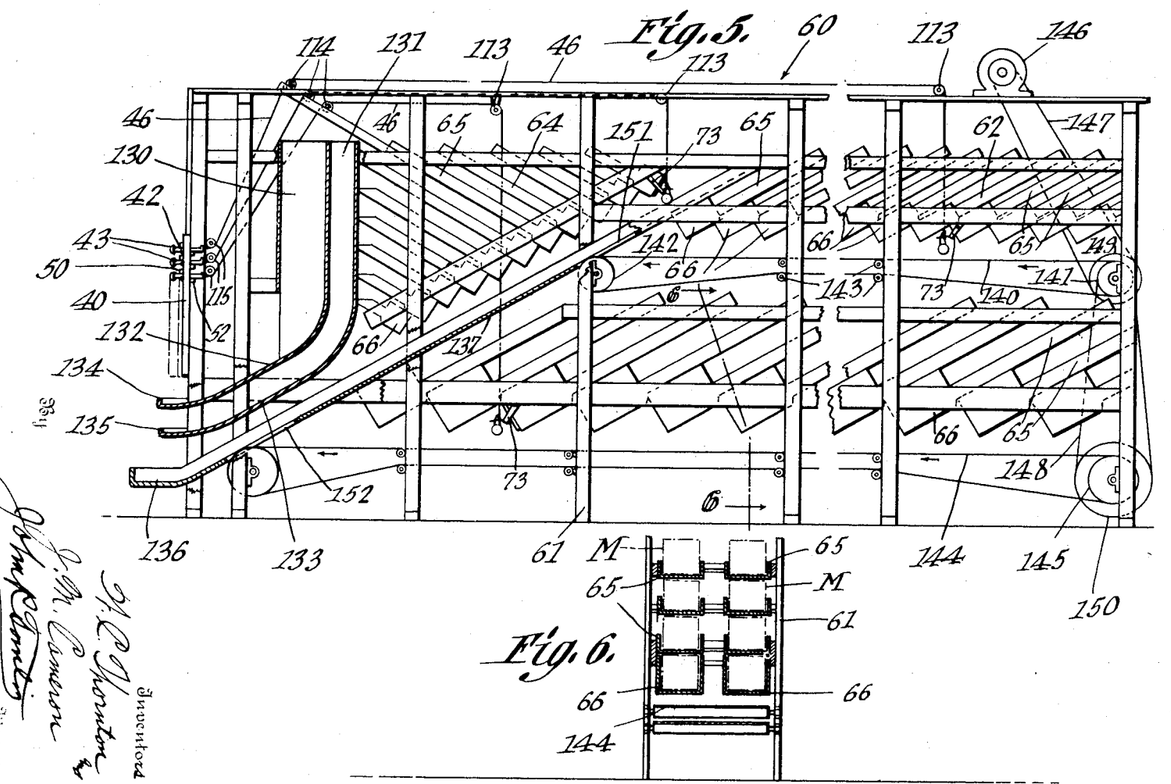
Figure 5 is a side elevation, part appearing in section, of a supporting frame and a "bank" of merchandise compartments.
Figure 6 is a fragmental vertical sectional view taken on the line 6—6 of Figure 5.

Extending rearwardly from the control board are a plurality of banks 60 of merchandise compartments, and in this instance three of such banks are shown, although it is to be understood that any preferred number may be employed. Each bank 60 comprises a frame 61 which supports preferably two upper horizontally disposed rows or nests 62 of merchandise compartments, two lower rows or banks 63 like compartments and two end rows 64 of like compartments which have their lower terminals disposed in a common inclined plane.

Figures 10, 11, 12:
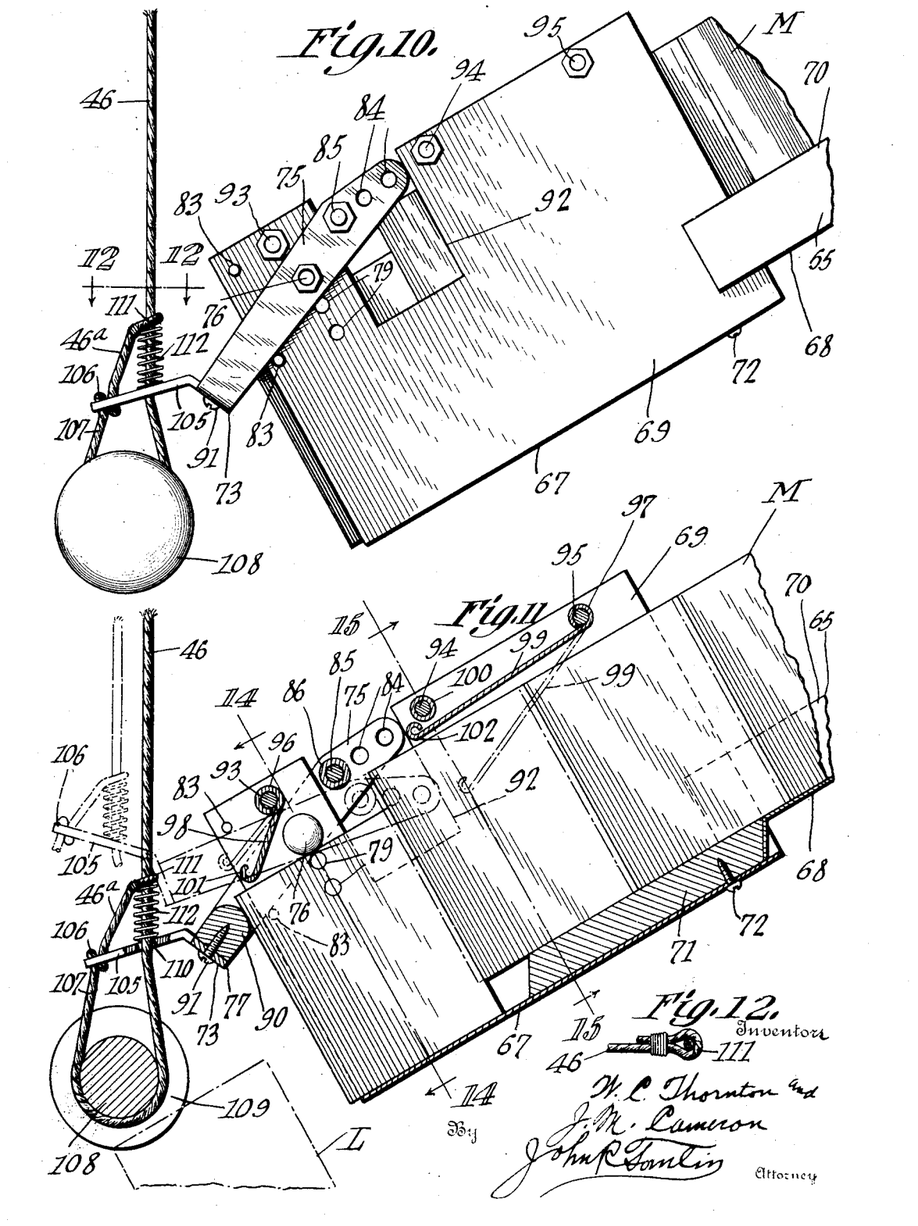
Figure 10 is a side elevation of a gate box and lower end of a chute or merchandise compartment.
Figure 11 is a vertical sectional view of the gate box and illustrating the gate in different operating positions.
Figure 12 is a fragmental horizontal sectional view taken on the line 12—12 of Figure 10.
Figure 13:
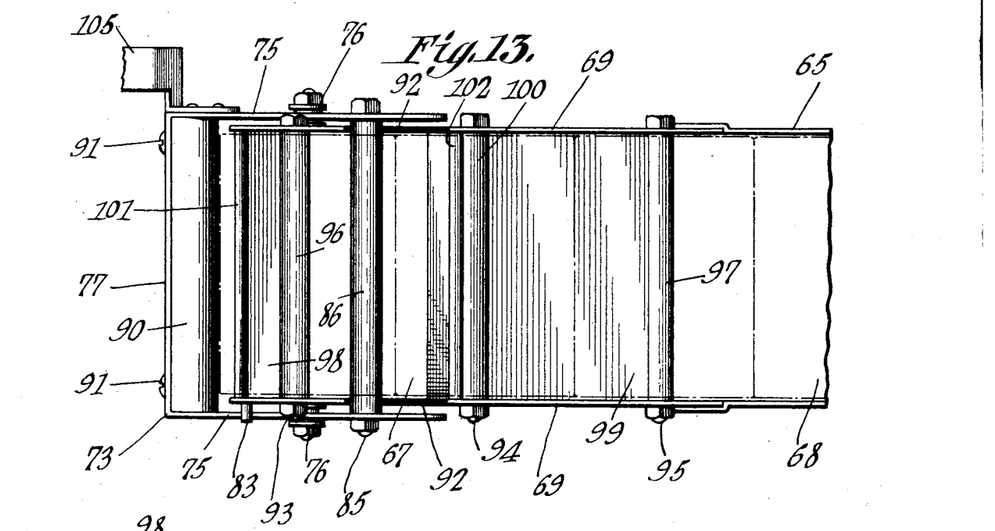
Figure 13 is a plan view of a gate box and lower end of its chute.

All the compartments or chutes are similar in construction, but vary in size or proportion to meet conditions which will be hereinafter disclosed, therefore a description of one will be common to all. Each compartment comprises an elongated chute or trough 65 which is U-shaped in cross section and has an open gate box 66 secured to the lower end thereof. The chutes and gate boxes are preferably formed of sheet metal, although other material may be employed if practically expedient. Each gate box comprises a bottom 67 that extends below the bottom 68 of the chute 65, and opposed side walls 69 which extend upwardly beyond the side walls 70 of the chute. A filler block 71 is detachably secured by a screw or other securing means 72 to the bottom 67 of the gate box, and the upper surface of the block 71 coincides with the upper face of the chute bottom 68, thereby forming in effect an extension of the chute bottom.

Figures 14, 15, 16:
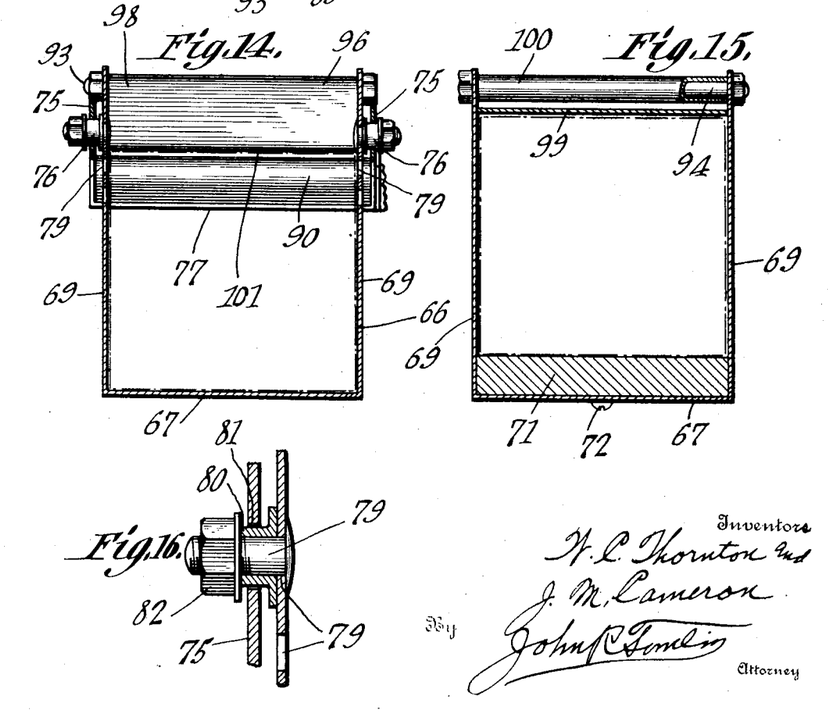
Figure 14 is a transverse sectional view taken on the line 14—14 of Figure 11, and viewed in the direction indicated by the arrows.
Figure 15 is a similar view taken on the line 15—15 of Figure 11 and looking in the opposite direction, as indicated by the arrows.
Figure 16 is an enlarged detail sectional view taken through a fulcrum member of the gate box.

A gate or release member 73 is provided and comprises opposed levers 75 which are fulcrumed intermediate their ends to the side walls 69 of the gate box, as indicated at 76, and these levers are united at their forward ends by a cross strip or member 77. In order to insure free movement of the gate 73 about its fulcrums 76, each fulcrum member includes, as shown in Figure 16, a fulcrum bolt 78 which extends through one of a number of apertures 79 formed in each side wall of the gate box and through a flanged sleeve 80. The flanged sleeve 80 is inserted in an aperture 81 formed in each lever portion 75 of the gate member, and the nut 82 is tightly screwed against the sleeve. This construction permits the free movement of the gate 73 about its fulcrums 76, and this movement can be limited by suitable stop members 83 which are preferably positioned within the path of travel of the gate levers 75. Each lever 75 is provided with spaced apertures 84 for the reception of a relatively long bolt 85 which extends through a spacing sleeve or spreader 86 positioned between the opposed levers 75, thereby providing a stop member. The cross member 77 has a stop member 90 detachably secured thereto by screws or other securing devices 91, the stop member 86 and 90 cooperate with instrumentalities to be hereinafter disclosed. Recesses 92 are formed in the opposed side walls of the gate box to permit the free movement of the stop member 86 therein, and the upper portions of the side walls 69 are braced by transversely extending bolts or rods 93, 94 and 95. The bolts 93, and 95 extend through spacing sleeves or spreaders 96 and 97, and these sleeves have wings or guide plates 98 and 99 extending therefrom and positioned between the side walls 69 of the gate box. A cylindrical sleeve or spreader 100 is supported by the bolt 94 and is rigidly clamped between the side walls 69, insuring a rigid box construction. The outer or free terminals of the guide plates 98 and 99 are rolled to form smooth curve terminals, as indicated at 101 and 102.

A finger 105 is carried by each gate 74 and one of the cables 46 is secured to the outer terminals of each finger, as shown at 106. Each cable 46 extends downwardly from its point of connection with the finger 105 and forms a depending loop 107 in which is positioned a weight 108 having an annular groove 109 to receive the cable. The loop extends upwardly through an aperture 110 formed in the finger 105, and through an eye 111 formed at the free terminal of the cable 46, and a helical spring 112 surrounds the cable 46 and is positioned between the eye or loop 111 and finger 105. Each cable 46 extends upwardly from the finger 105 of the gate and over a sheave 113, then forwardly over a similar sheave 114 and downwardly around a sheave 115 and then to a manipulating or control pin 42.

The chutes and gate boxes of the merchandise compartments are disposed at an angle of about 28 degrees to the horizontal, and at this angle the weight of the merchandise is supported by the floor of the compartment, because at this angle the weight of the cartons or containers of the merchandise is barely sufficient to overcome the frictional resistance between the merchandise containers M and the floor of the compartments. Referring to the Figures 10 and 11 it will be observed that the containers M of the merchandise are positioned in rows in the compartments and they are normally held against downward movement within the compartments by the stop member 90. Although the merchandise containers M are normally supported by the floor of each compartment, it has been found that these containers will, due to operating vibrations of the device, tend to creep downwardly and exert considerable stress against the stop member 90, and for this reason the gates 73 should be constructed with sufficient strength to safely support half the total weight of the merchandise positioned in each compartment.

When it is desired to discharge a selected container M of merchandise from its compartment, the clerk, who is stationed behind the counter 28, simply pulls the knob 43, over which the name of the desired article of merchandise is printed, thereby moving the cable 46 forwardly over its supporting sheaves 113, 114 and 115, and consequently raises the selected gate 73 against the gravity tension of the weight 108. Since a portion of the weight of the entire row of merchandise containers rests against the stop member 90, the lowermost container will, owing to the friction between the container and the stop member 90, tend to move upwardly with the stop member. This upward movement however is prevented by the guide member 98 which is adjusted to permit free outward or sliding movement of the container, but positioned to limit its upward movement. As the stop member 90 moves upwardly about the fulcrum 76 it also moved away from the gate box and containers, thereby insuring free movement of the gate. Before the stop member 90 moves from engagement with the lowermost container M the stop member 86 descends into the path of travel of the next container, as shown in dotted lines in Figure 11, and insures the release of only one container at each operation of the gate. This action is permitted by offsetting the bottom of the gate box below the bottom of the chute, thereby disposing the second lowermost container a suitable distance above the lowermost container. After the lowermost container has been discharged from the gate box, as indicated at L in Figure 11, the clerk releases the manipulating pin, as will be later described, and then the weight 108 returns the gate 73 to its normal position. As the gate returns to its normal position the stop member 86 is raised from engagement with the remaining lowermost container and permits it to gravitate into engagement with the stop member 90. During the upward movement of the stop member 86 the upward movement of the container which engages the stop will be limited by the adjusted guide plate 99. The device is now set for further use and may be operated repeatedly by merely pulling the proper manipulating knob 43. Each chute or compartment will contain only one assortment of merchandise, that is, all the merchandise in one chute will be "put up" in the same size and shape package. The number of sizes and shapes of merchandise sold in a grocery store is very great, and it is commercially impractical to make a different size gate and chute for each assortment. One size chute and gate box must be constructed to handle many different sizes and shapes of packages, and with this invention the entire stock can be handled with about four different sizes and shapes of compartments. A compartment may be used for a time with one article of merchandise and then used for something entirely different in size, shape and weight by a simple adjustment of the gate box. For instance a gate box may be employed to handle packages from four to six inches in height, any width less than six inches, and any length from four to twelve inches. The gate as shown permits of a large number of combinations, and this can be multiplied by the number of the different possible sizes of containers used in each combination.

The adjustment for different length packages can be readily made by removing the filler block 71 and inserting another of the proper length to handle the required size merchandise containers, and the stop member 86 can be adjusted in the different apertures 84 provided therefore, while the lower stop member 90 can be readily removed and another of the proper dimensions substituted for it. An adjustment for packages or containers of different heights can be effected by simply moving the gate fulcrum 76 to the proper aperture 79 provided therefor. The guide plates 98 and 99 may be readily adjusted by simply moving these plates about their pivot bolts 93 and 95 to the desired position, and then tighten the bolts to lock the plates in their adjusted positions.

Figure 17:
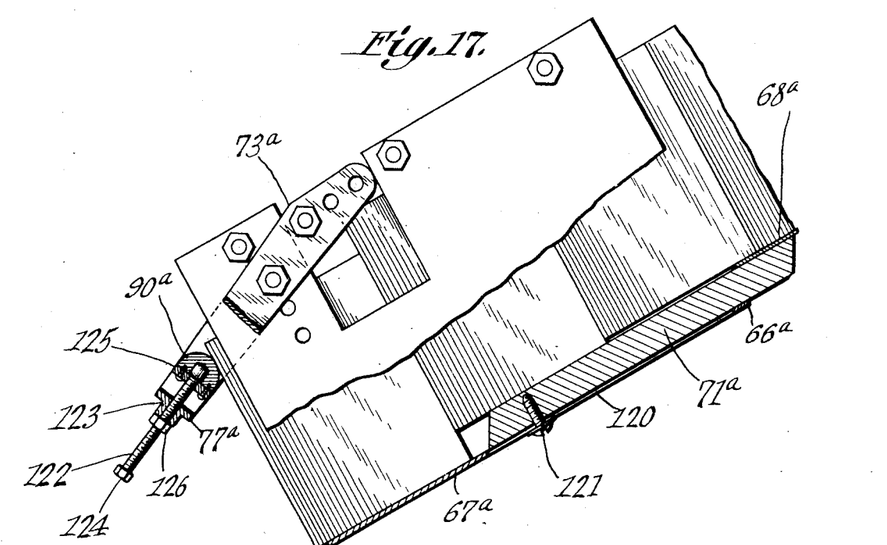
Figure 17 is a side elevation, partly in section, of a modified form of gate box.
Figure 18:
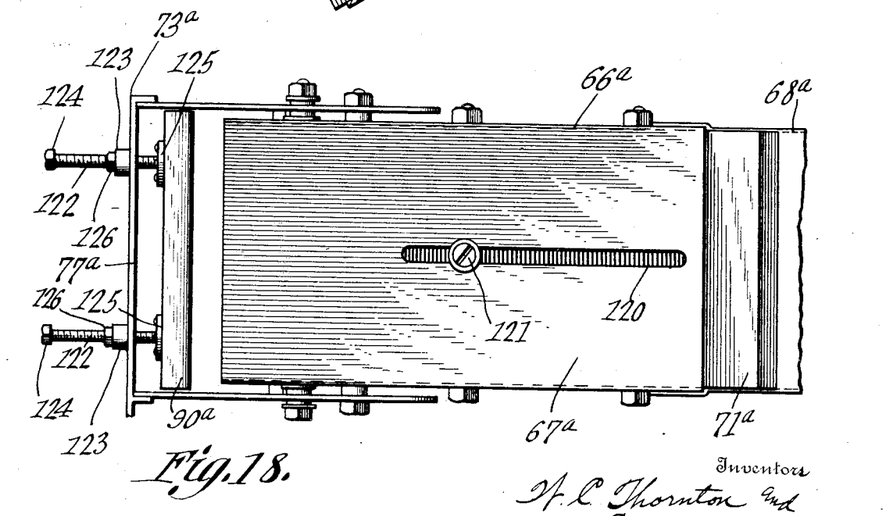
Figure 18 is a plan view thereof.

The form of the invention depicted in Figures 17 and 18 is similar to that disclosed in Figures 10 and 11, except provision is made for wide adjustment without removing or substituting any component of the device. It comprises the gate box 66$^a$ having an elongated slot 120 formed in the bottom 67$^a$ thereof for the reception of a screw or other securing device 121 which is screwed into the filler block 71$^a$. The rear or upper end of the filler block 71$^a$ extends under the sheet metal bottom 68$^a$ of the chute, and this block can be readily adjusted longitudinally of the gate box by simply releasing the screw 121 and moving the block to the desired position where it is again secured by tightening the screw. Spaced screws or stems 122 screw into threaded bosses 123 carried by the cross strip 77$^a$ of the gate 73$^a$. These stems 122 have non-circular wrenching engaging portions 124 formed at the outer ends thereof, and their inner ends are swivelled to the lower stop member 90$^a$, as indicated at 125. In order to adjust the stop member 90$^a$ to accommodate containers of different lengths, it is only necessary to release the jam nuts 126 carried by the stems 122 and rotate these stems, thereby moving the stop member 90$^a$ longitudinally with respect to the box 66$^a$.

The frame 61 supports a number, preferably two, of vertically disposed merchandise compartments or hoppers 130 and 131 and these compartments are preferably positioned immediately behind the control board 40. Inclined slide-ways or chutes 132 and 133 extend forwardly from the lower ends of the compartments 130 and 131 respectively to points below and in front of the board 40, where they form suitable horizontally disposed distributing tables or platforms 134 and 135. A larger table or platform 136 is positioned below the tables 134 and 135 and this table forms the forward extension of an inclined chute or slideway 137 which is positioned in front of the upper and lower horizontally disposed banks of compartments 62 and 63, and below the end banks 64 of compartments.

An endless conveyer 140 is positioned below the two rows or banks of compartments 62, and the top run of this conveyer is driven towards the chute 137 by a drive pulley 141, the opposed end of the conveyer being trained over a pulley 142, and its intermediate portion being operably supported by suitable rollers 143. A similar conveyer 144 is positioned below the compartments 163 and is driven by a pulley 145. The pulleys 141 and 145 are driven by a motor 146, or other approved source of power, through the instrumentality of belts 147 and 148 and pulleys 149 and 150. Apertures or passageways 151 and 152 are formed in the inclined chute 137 immediately adjacent the forward terminals of the conveyers 140 and 144 to permit the merchandise to be discharged from these conveyers onto the chute 137.

It will be manifest that this construction and arrangement will enable a single clerk standing before the stock or control board 40 to control the immediate delivery of any article or articles of merchandise supported in the compartments to the distributing tables before him. If it is desired to secure an article of merchandise supported by the top rows 62 of compartments, this can be quickly done by simply pulling the proper control knob 43 which will cause the selected article to discharge from its compartment onto the conveyor 140 which delivers it through the aperture 141 onto the chute 137, from which point it gravitates to the table 136 within convenient reach of the clerk or attendant. Any article from the bottom bank 63 of compartments is similarly delivered to the table 136 by the conveyor 144 and chute 137, and any article which is discharged from the end bank 64 of compartments will slide down the chute 137 to the same distributing table. Relatively large units or packages of merchandise, such as flour, sugar, salt and the like is housed or supported within the compartments 130 and 131. These articles are placed one above the other within these compartments, and as the clerk removes the articles from the tables 134 and 135 others gravitate to the tables to replace them, thereby disposing these articles within convenient reach of the clerk.

In order to aid the clerk in checking the articles of merchandise and to insure positive operation of the release mechanism of the components, the arrangement and construction disclosed in Figures 7, 8, and 9 are provided. It will be observed that the sheaves 115 are journaled at point slightly above the horizontal axes of the pins 47 so that in their normal position the pins 47 are slightly inclined or tilted with their rear ends uppermost. This causes each pin 42 to normally bind within its aperture 41 at diametrically opposed points and at opposite sides of the board 40, as indicated at 155 and 156 in Figure 8. In this figure there is shown four pins 42 in their various operating positions and for sake of convenience these positions are designated A, B, C, and D. When it is desired to secure a selected article, the proper knob 43 is grasped by the operator and moved from the position A to that shown at B. This causes the pin 42 to engage the bottom face of a front rib 50 and the top surface of a back rib 52, thereby releasing the pin and maintaining it in position for free longitudinal movement. The pin is then pulled outwardly to the position indicated at C, which action releases articles as hereinbefore described. Now the pin is released by the clerk or operator and its forward or knob end drops to the position shown at D, thereby locking the pin in its outermost position. It remains in this locked position while the clerk is selecting other merchandise, and "checks up" the articles delivered to him. If the articles delivered to the clerk correspond to the names appearing above the protruding pins 42 then the clerk has checked the accuracy of his operation, and he now lifts the knobs 43 and moves the protruding pins to their normal position, and in this movement the pins are guided by the ribs 50 and 52.

Since the longitudinal movement of the pin 42 within the apertures 41 is limited by the stops 47 and 48, the movement of the gate 73 about its fulcrum is also limited thereby, therefore it is necessary that the cables 46 be maintained in taut condition. To accomplish this, provision must be made to "take up" and "slack" in each cable or rope 46 to compensate for the tendency of the cable to vary its length, due to temperate changes and other causes. Referring to Figure 10, 11 and 12, it will be observed that the spring 112 normally exerts an upward tension on the eye or loop 111, and as the cable 46 moves upwardly the eye 111 grips the cable and raises the gate by an upward stress imparted to the portion of the cable indicated at 46ª. When the cable is released the weight 108 falls and draws the cable and gate downwardly. If there is any "slack" in the cable 46 after the gate 73 has reached its lowermost position, then the weight 108 will continue to fall and carrying the cable with it. This action exerts a downward pull on the eye or loop 111 against the tension of the spring 112, thereby releasing the cable for free downward movement. When the "slack" has been "taken up" the eye 111 again grips the cable and the device is ready for further operation.

In order to display the merchandise in stock, there is provided a promenade or aisle 160 which extends rearwardly from one end of the counter 28. A plurality of shelves 161 are preferably secured to the wall 20 of the store at one side of the promenade 160 for the reception of the articles of merchandise that are in stock. This enables the patrons to inspect the merchandise which they desire to purchase, thus greatly aiding them in the prompt selection of their requirements. One of the shelves has a lateral extension 162 for the reception of writing pads, pencils and the like, and it is employed as a writing desk by the patrons to enable them to comfortably write their orders for their proposed merchandise purchase if they wish.

After the patrons have secured the required articles of merchandise at the counter 28 they move to the cashier's counter 163, where they make their payments to a cashier who is positioned in uninterrupted view of the delivery transaction. By this arrangement the cashier has the advantage of seeing the merchandise as it is presented to him for inspection and payment, and he also observes the merchandise as it is delivered to the patron, thereby eliminating any temptation and probability of theft by the patrons.

Figures 19, 21:
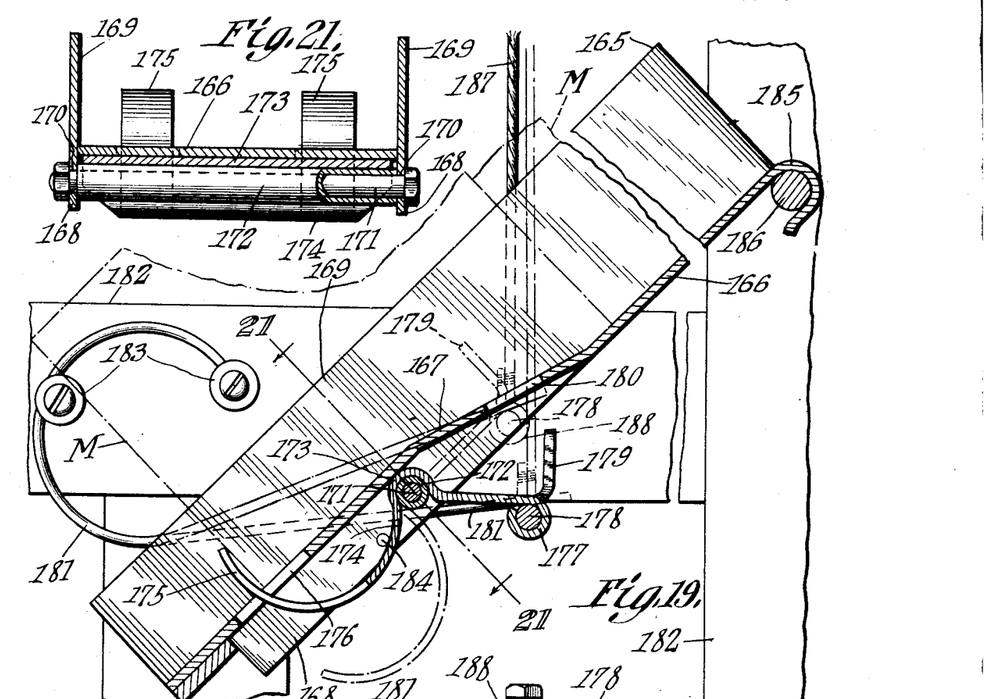
Figure 19 is a fragmental longitudinal sectional view taken through a modified form of compartment.
Figure 21 is a transverse sectional view taken on a line 21—21 of Figure 19.
Figure 20:
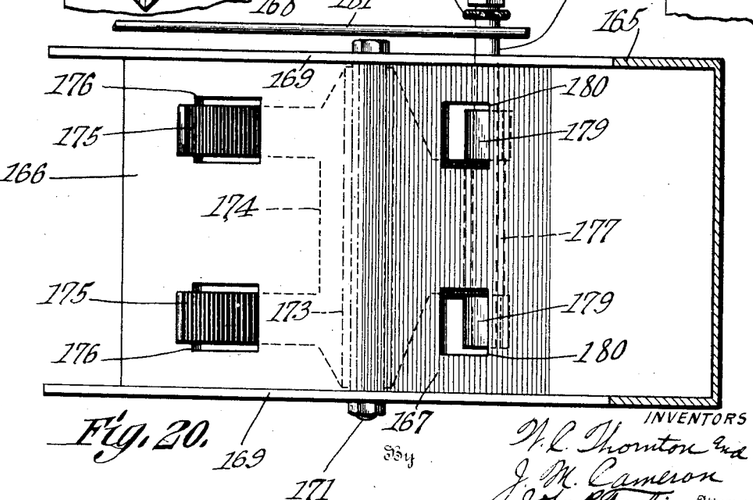
Figure 20 is a top view thereof.

The form of compartment illustrated in Figures 19, 20 and 21 comprises an inclined chute 165 which is preferably disposed at an angle of about 36 degrees to the horizontal. This chute has its bottom 166 offset intermediate its ends, as indicated at 167 to present an incline of about 25 degrees from the horizontal. By offsetting the lower portion of the chute bottom 166 opposed flanges 168 are formed below the bottom 166, which flanges form extensions of the side walls 169. Alined apertures 170 are formed in the flanges 168 for the reception of a transversely extending bolt 171. The bolt 171 has a spacing sleeve or spreader 172 mounted thereon and the spacing sleeve is operably engaged by the transversely extending arcuate fulcrum seat 173 formed at intermediate portion of a gate 174. Spaced arcuate projections or stop members 175 extend downwardly from the fulcrum seat of the gate 174 and normally extend through spaced apertures 176 formed in the bottom or floor of the chute 165. The upper portion 177 of the gate is rolled upon itself to form a transversely extending eye or sleeve 177 for the rigid reception of the transversely extending rod or finger 178. Spaced prongs or stop members 179 extend upwardly from the sleeve 177 and through spaced apertures 180 formed in the bottom of the chute. The gate 174 is held in its normal position, as indicated in full lines in Figure 19, by a suitable spring member 181 which is secured to a supporting frame 182, as indicated at 183, and the free end of this spring engages the finger 178. A stop pin 184 is positioned in the path of movement of the gate 174 and holds the gate in normal position against the tension of the spring 181. The upper terminal of the chute bottom 166 is turned upon itself to form a hook 185 which engages a transverse support or rod 186 which is carried by the frame 182, thereby supporting the upper portion of the chute. A cable 187 is secured to the finger 178, as indicated at 188, and this cable extends over suitable guide sheaves, not shown, to any suitable operating instrumentalities.

When the clerk or operator pulls on the cable 187, the gate is turned about its fulcrum against the tension of the spring 181, thereby moving the lower stop members 175 from engagement with the lowermost merchandise container M. This liberates the lowermost container which gravitates from the chute, and at the same time, the upper stop members 179 project into the path of travel of the next container, thereby insuring the delivery of only one container or unit of containers at each operation of the device. The gate is preferably formed of resilient or spring material so that the stop members 175 and 179 may slightly yield when engaged by the descending articles of merchandise, thereby absorbing the shock of the impact to protect both the merchandise and the compartment. Owing to the relatively steep incline of the chute 165 the containers of merchandise will descend very rapidly, but when the offset inclined portion 167 is reached the speed of movement of the containers is reduced, thereby reducing the impact upon the engagement of the containers with the stop members.

From the foregoing it is manifest that this system and construction is highly advantageous in that it enables a single clerk positioned within a restricted station to collect and satisfactorily distribute to the patrons such quantities of merchandise in a period of time that heretofore required the services of a large number of clerks or attendants, and also insures the proprietor against losses by theft.

Having thus described the invention, what is claimed as new is:—

1. In a store, a control board, a merchandise container, releasing means operably associated with the container, a manually operable control member operably supported by the control member and operably connected with the releasing means to move the releasing means to releasing position when the said control member has been moved from its normal position to releasing position, means for limiting the movement of the control member when it has reached either releasing or normal position, and means for locking the control member in its releasing position.

2. In a store, a control station, a power actuated conveyor, a plurality of merchandise containers, means operable from the control station for releasing articles of merchandise from the containers, onto power actuated conveyor, a gravity conveyor extending to the control station and having an aperture formed therein to permit articles of merchandise to pass from the power actuated conveyor to the gravity conveyor.

3. In a store, a control station, a bank of merchandise containers, means operable from the control station for releasing articles of merchandise from the containers, a power actuated conveyor positioned beneath the said banks of containers, a gravity conveyor cooperating with the power actuated conveyor and extending to the control station, and a separate bank of merchandise containers positioned above the gravity conveyor, and means operable from the control station for releasing articles of merchandise from the separate bank of containers.

4. In a store, a control station, power actuated conveyors, a bank of merchandise containers positioned above each power actuated conveyor, means operable from the control station for releasing articles of merchandise from the containers onto the power conveyors, a gravity conveyor cooperating with the power conveyors and extending to the control station, a separate bank of merchandise compartment positioned above the gravity conveyor, and means operable from the control station for releasing articles of merchandise from the separate banks of containers onto the gravity conveyor.

5. In a store, a control station, a power actuated conveyor, a bank of merchandise containers positioned above the power actuated conveyor, means operable from the control station for releasing articles of merchandise from the said containers onto the power actuated conveyor, a gravity conveyor extending to the control station and having an aperture formed therein to permit articles of merchandise to pass from the power actuated conveyor to the gravity conveyor, a separate bank of merchandise containers positioned above the gravity conveyor, and means operable from the control station for releasing articles of merchandise from the container positioned above the gravity conveyor onto said conveyor.

6. In a store, a control station, a bank of merchandise containers, means operable from the control station for releasing articles of merchandise from the containers, a power actuated conveyor positioned beneath the bank of containers, a gravity conveyor cooperating with the power actuating conveyor and extending to the control station, merchandise containers separate from the said bank of containers, and gravity conveyors extending from the separate merchandise containers to the control station.

7. In a store, a merchandise container, releasing means operably associated with the container, a manually operable control member, a flexible member operably connecting the releasing means and said control member, and means for automatically maintaining the flexible member in taut condition.

8. In a store, merchandise compartments, discharging means operably associated with each merchandise compartment, manually operable control members operably connected with the discharging means to move the discharging means to discharge position when the manually operable members have been moved from their normal position to discharging position to release selected articles of merchandise from the said compartments, and means for maintaining the manually operable control members in their discharging position until purposely released.

9. In a store, a control station, merchandise compartments, discharging means operably associated with each merchandise compartment, manually operable control members positioned at the control station and operably connected with the discharging means to move them to discharging position when the manually operable control members have been moved from their normal position to discharging position to release selected articles of merchandise from the said compartments, means for maintaining the manually operable control members in their discharging position until purposely released, and means for conveying the discharged articles of merchandise to the control station.

10. In a store, a merchandise container having a portion of its bottom offset to support the outermost contained article of merchandise in a plane different from the supporting plane of the other contained articles of merchandise, means for adjusting the extent of the offset portion, a release member operably associated with the container and arranged to alternately engage and disengage the outermost article of merchandise and the outermost of the other articles of merchandise to effect the release of the articles of merchandise from the container one at a time.

11. In a store, a merchandise container, a release member operably associated with the container and arranged to release articles of merchandise from the containers one at a time, and means for adjusting the dimensions of the outlet terminal of the container.

In testimony whereof we affix our signatures.

WILLIAM CARTER THORNTON.
JOHN McALPINE CAMERON.